(12) United States Patent
Mori et al.

(10) Patent No.: US 10,543,628 B2
(45) Date of Patent: Jan. 28, 2020

(54) MOLD FOR FORMING A FOAM PAD WITH INTERSECTING RIDGES

(71) Applicant: Sekisui Plastics Co., Ltd., Osaka-shi (JP)

(72) Inventors: Koji Mori, Tenri (JP); Yushi Sakakibara, Tenri (JP); Masamitsu Kondo, Tenri (JP); Motokazu Yoshii, Tenri (JP)

(73) Assignee: Sekisui Plastics Co., Ltd., Osaka-shi (JP)

( * ) Notice: Subject to any disclaimer, the term of this patent is extended or adjusted under 35 U.S.C. 154(b) by 293 days.

(21) Appl. No.: 15/460,656

(22) Filed: Mar. 16, 2017

(65) Prior Publication Data

US 2017/0182687 A1    Jun. 29, 2017

Related U.S. Application Data

(62) Division of application No. 13/819,159, filed as application No. PCT/JP2011/069694 on Aug. 31, 2011.

(30) Foreign Application Priority Data

Aug. 31, 2010   (JP) ................................. 2010-194373
Aug. 31, 2010   (JP) ................................. 2010-194443

(51) Int. Cl.
*B29C 44/58*      (2006.01)
*B29C 44/34*      (2006.01)
(Continued)

(52) U.S. Cl.
CPC .......... *B29C 44/58* (2013.01); *B29C 44/3426* (2013.01); *B29C 44/445* (2013.01);
(Continued)

(58) Field of Classification Search
CPC ... B29C 44/58; B29C 44/582; B29C 44/3426; B29C 44/343
(Continued)

(56) References Cited

U.S. PATENT DOCUMENTS 1,594,261 A  *  7/1926  Herschmann ...... A47G 27/0468
                                                    404/28
1,948,327 A  *  2/1934  Berwick ................ B60N 3/044
                                                    428/138
(Continued)

FOREIGN PATENT DOCUMENTS

DE    2115599 A1  * 10/1972  ............. B29C 44/14
DE    2609373 A1  *  9/1977  ............. B29C 37/02
(Continued)

OTHER PUBLICATIONS

International Search Report dated Nov. 15, 2011, issued for PCT/JP2011/069694.
(Continued)

*Primary Examiner* — Michael Safavi
(74) *Attorney, Agent, or Firm* — Locke Lord LLP

(57) ABSTRACT

A molded foam is provided in which even when a force in a sliding direction is applied to another member in contact with its surface, the occurrence of a shift in position relative to the other member can effectively be prevented and the occurrence of unusual noise due to rubbing between its surface and the other member can effectively be prevented. The molded foam is formed by heating expandable resin particles filled into a foaming mold. The molded foam has a plurality of first ridges arranged in one direction and a plurality of second ridges arranged in another direction and disposed so as to intersect the first ridges, the first and second ridges being provided on the surface of the molded foam.

10 Claims, 7 Drawing Sheets

(51) Int. Cl.
*B60N 3/04* (2006.01)
*B29C 44/44* (2006.01)
*B29L 31/30* (2006.01)

(52) U.S. Cl.
CPC ...... *B60N 3/048* (2013.01); *B29K 2995/0072* (2013.01); *B29L 2031/3017* (2013.01); *Y10T 428/24504* (2015.01)

(58) Field of Classification Search
USPC ......... 249/140; 5/653, 655.9, 656, 633, 636, 5/651; 428/167, 169
See application file for complete search history.

(56) References Cited

U.S. PATENT DOCUMENTS

| | | | | |
|---|---|---|---|---|
| 2,341,818 | A | * | 2/1944 | Schellings ............... A47K 7/02 15/244.4 |
| 2,546,394 | A | * | 3/1951 | Harmon ............. A47G 27/0231 248/633 |
| 3,026,544 | A | * | 3/1962 | Persicke .............. A47C 27/144 297/DIG. 1 |
| 3,163,687 | A | * | 12/1964 | Einhorn .................. B29C 44/58 249/141 |
| 3,222,697 | A | * | 12/1965 | Scheermesser ...... A47C 27/144 297/452.48 |
| 3,370,117 | A | | 2/1968 | Blue |
| 3,711,362 | A | * | 1/1973 | Ballard .................. B29C 67/20 156/219 |
| 4,192,638 | A | * | 3/1980 | Lezier ................. B29C 44/3426 249/111 |
| 6,342,288 | B1 | | 1/2002 | Tada et al. |
| 2004/0224130 | A1 | | 11/2004 | Melucci et al. |

FOREIGN PATENT DOCUMENTS

| | | | | |
|---|---|---|---|---|
| DE | 4302987 | A1 | | 8/1994 |
| DE | 202004013549 | U1 | | 1/2006 |
| EP | 0967124 | A2 | | 12/1999 |
| EP | 1630036 | A2 | | 3/2006 |
| EP | 1630036 | A3 | | 6/2007 |
| GB | 2133980 | | * 8/1984 | ............... A47C 7/18 |
| GB | 2172547 | | * 9/1986 | ............ B32B 15/04 |
| JP | 54-036254 | U | | 3/1979 |
| JP | 11-343360 | A | | 12/1999 |
| JP | 2000-006741 | A | | 1/2000 |
| JP | 2003-127796 | A | | 5/2003 |
| WO | WO-03076159 | | * 9/2003 | ......... B29C 44/3426 |
| WO | WO-2017149998 | A1 | * 9/2017 | ............ B29C 33/38 |

OTHER PUBLICATIONS

Written translation of DE 20 2004 013 549.
Machine translation of DE 20 2004 013 549 obtained from EPO on Aug. 19, 2015.
Office Action dated Nov. 9, 2018, issued for the German patent application No. 112011102871.7.

* cited by examiner

MOLD FOR FORMING A FOAM PAD WITH INTERSECTING RIDGES

TECHNICAL FIELD

The present invention relates to a molded foam formed by heating expandable resin particles filled into a foaming mold.

BACKGROUND ART

In general, a molded foam is manufactured by a manufacturing method described below. First, resin particles are preliminarily foamed to obtain expandable resin particles. Next, the obtained expandable resin particles are filled into a foaming mold (hereinafter, referred to as a "mold"). The expandable resin particles filled into the mold are again foamed by being heated with steam, thereby forming a molded foam. The formed molded foam is cooled in the mold by using cooling water or the like. The cooled molded foam is released from the mold, thus obtaining the molded foam (see, for example, Patent Document 1, paragraph 0003).

CITATION LIST

Patent Document

Patent Document 1: Japanese Patent Laid-Open No. Hei-11-343360

DISCLOSURE OF THE INVENTION

Problems to be Solved by the Invention

The molded foam manufactured as described above is light in weight and has good moldability. In recent years, therefore, the molded foam has been used as an interior material for vehicles or the like in many of its applications.

For example, in some cases for the interior of the vehicle, a molded foam is used as a member constituting a floor for the purpose of improving the shock-absorbing effect against passenger's feet so that the riding comfort is high. More specifically, in some cases, a tibia pad, which is a molded foam, is interposed as an interior material between a floor panel and a floor carpet. The tibia pad is ordinarily a pad in a flat plate form having a flat surface. There is, therefore, a possibility of a force in a direction (sliding direction) along the surface of the tibia pad (hereinafter, referred to as a moving force) being applied to the floor carpet (another material member), depending on the motion of passenger's feet put on the floor carpet. When the carpet receives such a force, there is a possibility of the floor carpet sliding easily on the flat surface of the tibia pad to shift in position relative to the tibia pad. There is, therefore, a need to fix the floor carpet and the tibia pad to each other by using a double-sided pressure-sensitive adhesive tape or the like, and the work of forming the floor of the vehicle or the like is troublesome.

In some cases, the tibia pad is used in a state of having its surface maintained in contact with some of surrounding members, such as a frame constituting the vehicle. In such a case, there is a possibility of the tibia pad and another member rubbing together to cause unusual noise due to the vibration during travel of the vehicle, for example.

Therefore, a first object of the present invention is to provide a molded foam capable of effectively being prevented from shifting in position relative to another member in contact with a surface of the molded foam when a force is applied to it in a direction of sliding on the other member.

A second object of the present invention is to provide a molded foam capable of effectively preventing its surface from being in contact with each other and rubbing on another member to cause unusual noise.

Means for Solving Problems

A molded foam in a first aspect of the present invention provided to achieve the above-described first object is a molded foam formed by heating expandable resin particles filled into a foaming mold, the molded foam including a plurality of first ridges arranged in one direction, and a plurality of second ridges arranged in another direction and disposed so as to intersect the first ridges, the first ridges and the second ridges being provided on a surface of the molded foam.

With this arrangement, for example, when another member is placed on the molded foam, and when the other member receives an external force (moving force) in a sliding direction, the plurality of first ridges arranged in one direction and the plurality of second ridges arranged in another direction so as to intersect the first ridges can support the moving force. More specifically, the first ridges and the second ridges are capable of maintaining a state of receiving the moving force in the same attitude with stability without falling down. Accordingly, the first ridges and the second ridges produce an anchoring effect by being brought into suitable contact with the other member. In this way, the other member can be maintained in a state of being not easily slidable on the molded foam. Therefore, the other member does not easily shift in position relative to the molded foam. The other member may be a member made of a metal such as a metal sheet as well as a soft sheet (or mat). If the surface of the metal sheet is not completely smooth surface, the first ridges and the second ridges can produce an anchoring effect by being brought into suitable contact with the surface of the metal sheet.

In a molded foam in a second aspect of the present invention, to achieve the above-described second object, each of the first ridges and the second ridges has a sectional shape tapered toward its top.

In this arrangement, since each of the first ridges and the second ridges has a sectional shape tapered toward its top, it has flexibility at least at the top side. Also, since each of the first ridges and the second ridges has a sectional shape tapered toward its top, the area of contact between the molded foam and the other member is reduced. Moreover, the first ridges and the second ridges are constructed so as to support each other by intersecting each other, there is no possibility of the first ridges and the second ridges being largely deformed from their base portions. Therefore, even when the molded foam and the other member receive a force such that they rub together, portions on the top sides of the first ridges and the second ridges are deformed by following a relative small change in position between the molded foam and the other member. This means that sliding between the first ridges and the second ridges and the other member does not easily occur. As a result, it is possible to effectively prevent the occurrence of unusual noise.

In the molded foam in accordance with the present invention, it is preferable that the plurality of first ridges be arranged with a constant pitch and the plurality of second ridges be arranged with a constant pitch.

The arrangement of the first ridges and the second ridges with a constant pitch ensures that when the molded foam and the other member receive a force such that they rub together, the force applied to the first ridges and the second ridges is evenly dispersed, thus further improving the effect of preventing unusual noise.

In the molded foam in the second aspect of the present invention, the tapered shape may be formed so as to have a smoothly continuous contour in sections of the first ridges and the second ridges.

In the second molded foam in accordance with the present invention, the tapered shape may be formed so as to have an acute contour in sections of the first ridges and the second ridges.

Advantageous Effects of Invention

In the molded foam in the first aspect of the present invention, when a force in a sliding direction is applied to the molded foam and the other member in contact with the molded foam, the force can be supported by the plurality of first ridges arranged in one direction and the plurality of second ridges arranged in another direction such as to intersect the first ridges. That is, the first ridges and the second ridges can receive the moving force in the same attitude with stability without falling down. In this way, the other member can effectively be prevented from shifting in position relative to the molded foam or the molded foam can effectively be prevented from shifting in position relative to the another member.

In the molded foam in the second aspect of the present invention, the plurality of first ridges arranged in one direction and the plurality of second ridges arranged in another direction and disposed so as to intersect the first ridges are provided on a surface of the molded foam, and the sectional shape of each of the first ridges and the second ridges is tapered toward its top, thereby ensuring that sliding cannot easily occur between the first ridges and second ridges and the other member. As a result, it is possible to effectively prevent the occurrence of unusual noise.

BRIEF DESCRIPTION OF DRAWINGS

FIG. 2(a) is a perspective view; FIG. 2(b) is a plan view; and FIG. 2(c) is a longitudinal sectional view.

FIG. 3(a) is a longitudinal sectional view; and FIG. 3(b) is a plan view (bottom view) of an inside wall on the left.

DESCRIPTION OF EMBODIMENTS

An embodiment of the present invention will be described with reference to the drawings.

Figure 1:
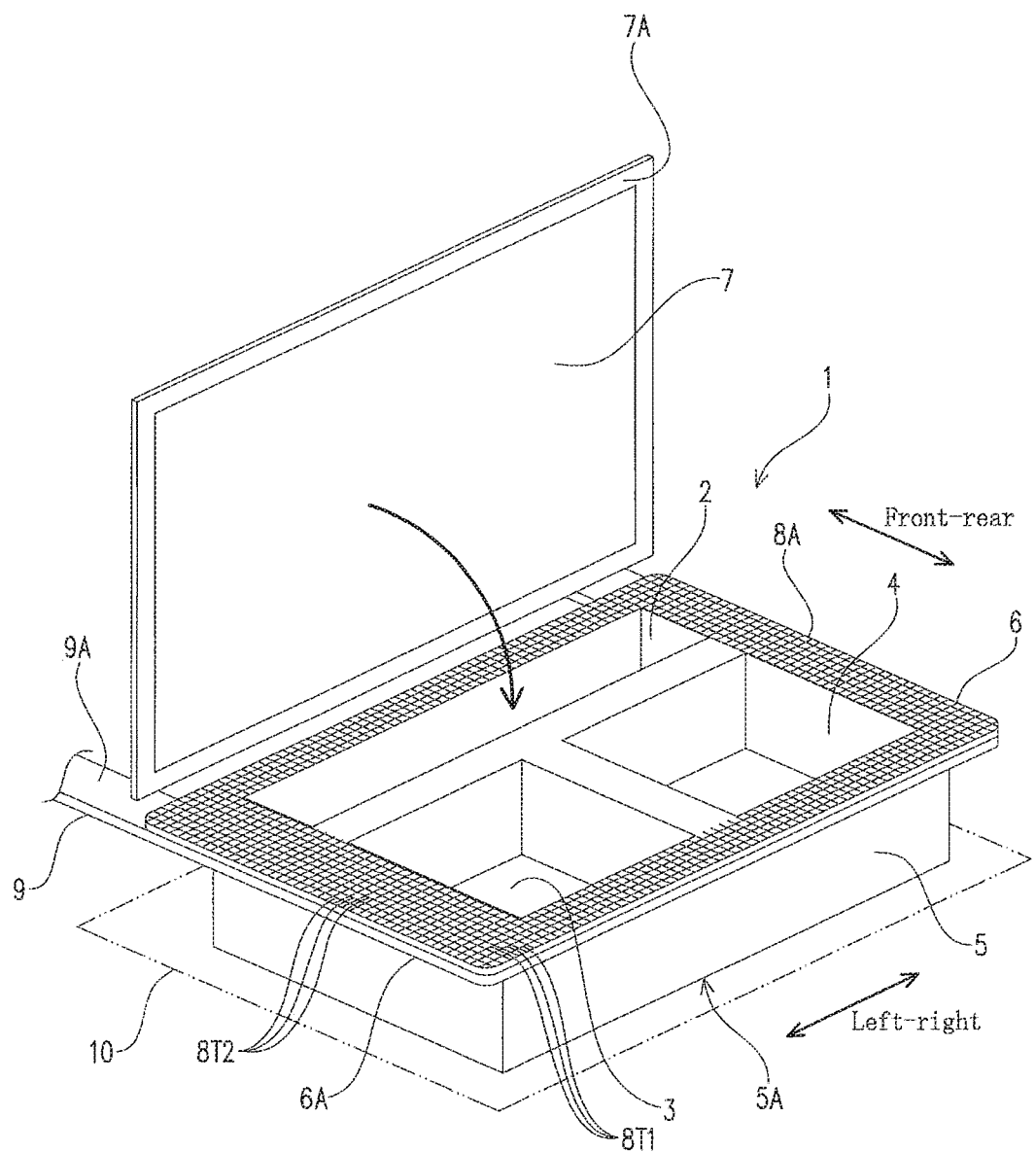
FIG. 1 is a perspective view of a state immediately before a lid of a tool box (a molded foam in a first embodiment) incorporated in a vehicle is closed.

A molded foam is formed by filling expandable resin particles obtained by preliminarily foaming resin particles into a foaming mold and then heating the expandable resin particles. The ratio of expansion can be changed as desired according to the purpose for which the molded foam is to be used. FIG. 1 shows a tool box 1 incorporated in a vehicle as an example of the molded foam formed as described above. The tool box 1 has a rectangular box body 5 having three storage portions 2, 3, and 4 and also has an annular flange portion 6 formed on the upper end of the box body 5. The tool box 1 is supported by having the flange portion 6 placed on an upper surface 9A of a U-shaped frame member 9 made of a metal and provided on the vehicle body side. The tool box 1 also has a lid 7 in a plate form for covering the upper surface of the box body 5. A contact member 7A in an annular plate form, which is brought into contact with the upper surface of the box body 5, is formed along an outer peripheral portion of the lid 7.

The molded foam can be made of any expandable resin material. It is preferable that the molded foam be formed, for example, of a thermoplastic resin among expandable resin materials. Examples of the thermoplastic resin are a polystyrene resin, a polyolefin resin (e.g., a polypropylene resin or a polyethylene resin), a polyester resin (e.g., polyethylene terephthalate, polybutylene terephthalate or polyethylene naphthalate), a polycarbonate resin, and a polylactic resin. It is preferable to use a composite resin including polystyrene and polyethylene among these resins as the expandable resin material.

On an outer peripheral (rectangular) upper surface 8A in the horizontal upper surface of the tool box 1, a plurality of first ridges 8T1 projecting upward from the upper surface 8A and extending linearly in a left-right direction, as shown in FIG. 1 and FIGS. 2(a), 2(b), and 2(c). Further, on the upper surface 8A, a plurality of second ridges 8T2 projecting upward from the upper surface 8A so as to have the same height as that of the first ridges 8T1 and extending linearly in a front-rear direction orthogonal to the first ridges 8T1. The plurality of first ridges 8T1 are arranged in the front-rear direction with a constant pitch P1 set therebetween. The plurality of second ridges 8T2 are arranged in the left-right direction with a constant pitch P2 (P1=P2 in the present embodiment) set therebetween. Each of the first ridges 8T1 and the second ridges 8T2 has a sectional shape tapered toward its top. More specifically, each of the first ridges 8T1 and the second ridges 8T2 is a generally triangular sectional shape having a sharp contour (constituted by contour lines forming an acute angle).

Accordingly, the contact member 7A of the lid 7 is pressed against the upper surface 8A of the tool box 1 by the weight of the lid 7 when the lid 7 is closed. Thus, the contact member 7A can be stably supported by the first ridges 8T1 and the second ridges 8T2. Since the sectional shape of each of the first ridges 8T1 and the second ridges 8T2 is generally triangular, the area of contact between the first ridges 8T1 and the second ridges 8T2 and the contact member 7A is small. Therefore, the first ridges 8T1 and the second ridges 8T2 can be brought into suitable contact with the contact member 7A. An anchoring effect is thereby produced, such that the lid 7 on the tool box 1 does not easily move relative to the tool box 1. Prevention of the occurrence of unusual noise by rubbing between the contact member 7A and the tool box 1 is also enabled.

In general, the mechanism of generation of unusual noise (sounding) (the mechanism of sounding) is explained by a stick-slip phenomenon. The stick-slip phenomenon is a phenomenon in which when two objects in a state of being pressed against each other under a load move relative to each other while being maintained in contact with each other, sticking and sliding alternately occur between the surfaces of the objects to reduce the smoothness of relative movement between the two objects. When such a phenomenon occurs, vibration (frictional vibration) occurs in the objects and a sounding phenomenon appears. That is, it is thought that one of the objects repeats moving little by little by alternating sliding over and sticking to the other object (counterpart) to generate sound. The first ridges 8T1 and the second ridges 8T2 are markedly effective on such a phenomenon. Because avoidance of such a phenomenon is enabled, it is possible to prevent one of the objects from shifting in position relative to the other.

If the two objects are molded foams light in weight and having high frictional coefficients, unusual noise can be easily caused by vibration or the like. Among molded foams, one foamed at a higher expansion ratio can produce unusual noise more easily. In a case where the molded foam formed of such a soft material has a rectangular contact surface in a direction orthogonal to the direction along which the objects rub together, a corner portion in a position on the front side in the rubbing direction in the contact surface has a higher frictional resistance and can easily be a cause of unusual noise by rubbing. The first ridges 8T1 and the second ridges 8T2 are also markedly effective on the occurrence of unusual noise in such a case.

That is, the first ridges 8T1 and the second ridges 8T2 each have a tapered sectional shape, and therefore have flexibility at least at the top side and a reduced area of contact with the contact member 7A. Moreover, since the first ridges 8T1 and the second ridges 8T2 are constructed so as to support each other by intersecting each other, there is no possibility of the first ridges 8T1 and the second ridges 8T2 being largely deformed from their base portions. Therefore, even when the tool box 1 and the lid 7 receive a force such that they rub together, portions on the top sides of the first ridges 8T1 and the second ridges 8T2 are deformed by following a relative change in position between the first ridges 8T1 and the second ridges 8T2 and the contact member 7A. This means that sliding between the first ridges 8T1 and the second ridges 8T2 does not easily occur. As a result, it is possible to effectively prevent the occurrence of unusual noise.

In particular, by forming the plurality of first ridges 8T1 and the plurality of second ridges 8T2 such that the first ridges 8T1 and the second ridges 8T2 extend orthogonal to each other as described above, the annular (rectangular) frame portion surrounded on all sides are formed so as to be continuous along the front-rear and left-right directions. The shape-maintaining strength of the first ridges 8T1 and the second ridges 8T2 can be improved in this way. Thus, further effectiveness in preventing unusual noise and in preventing a shift in position is ensured.

The ratio of the area of the region in which the above-described first ridges 8T1 and the second ridges 8T2 are formed (ridge formation region) to the total area of the outer periphery of the upper surface 8A of the tool box 1 (the proportion of the ridge formation region in a unit area) is preferably 80% or less, more preferably 50% or less. By setting the area in such proportion, the effect of preventing positional shifting or positional displacement, not to mention the effect of preventing unusual noise, is further improved.

First ridges 8T1 and second ridges 8T2 may also be formed on a lower surface 6A of the flange portion 6. In such a case, the tool box 1 can be prevented from being moved relative to the frame member 9 made of metal, for example, by vibration or the like during travel of the vehicle. Prevention of the generation of unusual noise caused by rubbing between the lower surface 6A of the flange portion 6 and the upper surface 9A of the frame member 9 is thereby enabled. First ridges 8T1 and second ridges 8T2 may also be formed on a lower surface 5A of the box body 5 that is brought into contact with a vehicle constituent member 10 indicated by the double-dot-dash line in FIG. 1. In such a case, the tool box 1 can be prevented from being moved relative to the vehicle constituent member 10 by vibration or the like during travel of the vehicle. Prevention of the generation of unusual noise caused by rubbing between the lower surface 5A of the box body 5 and the vehicle constituent member 10 is thereby enabled.

Figure 2A:
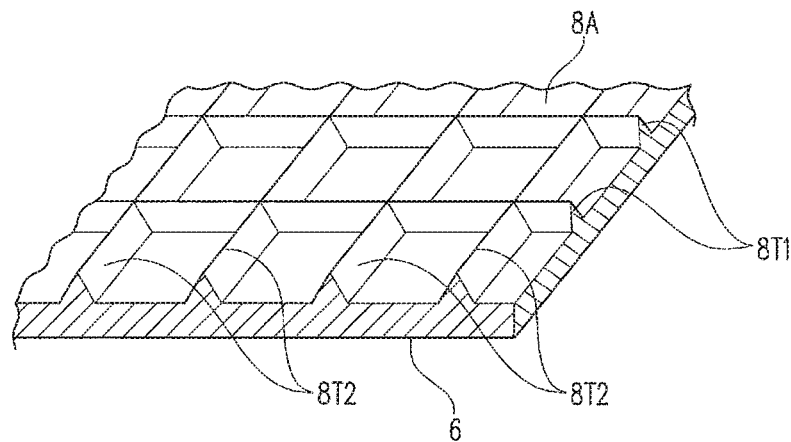
FIGS. 2(a), 2(b), and 2(c) are enlarged views of an upper surface of a flange portion of the tool box.
Figure 2B:
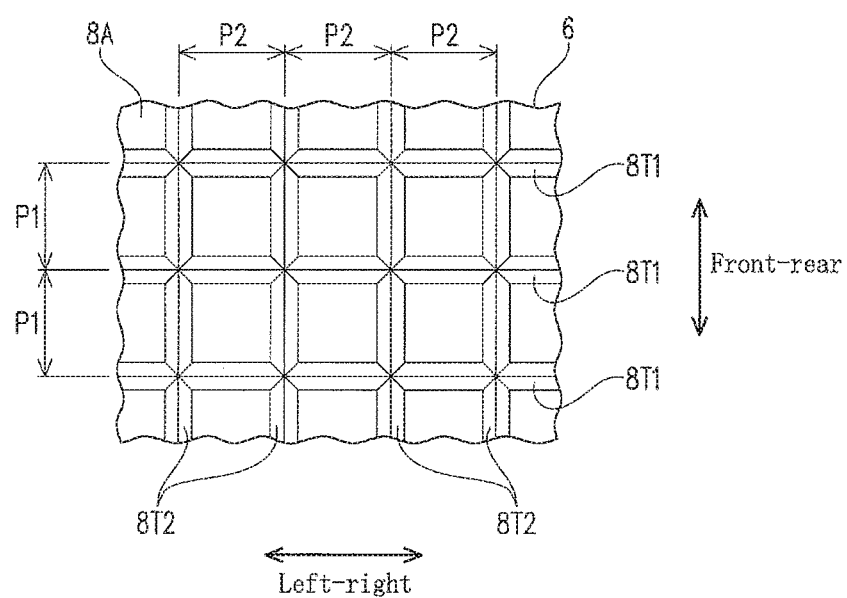
Figure 2C:
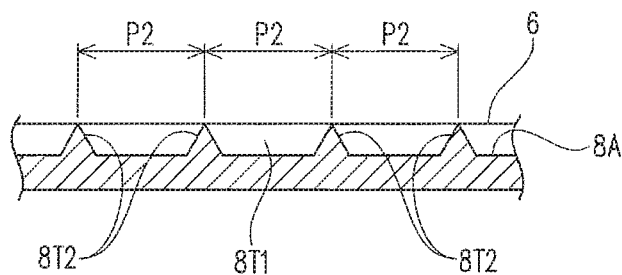

The first ridges 8T1 and the second ridges 8T2 are low ridges having a height of 1 mm or less. In FIG. 1, therefore, the first ridges 8T1 and the second ridges 8T2 are indicated by lines. In FIGS. 2(a), 2(b) and 2(c), the first ridges 8T1 and the second ridges 8T2 are illustrated in enlarged diagrams in order to clearly show the shapes of the first ridges 8T1 and the second ridges 8T2.

In some cases, in the surface of the tool box 1, which is a molded foam formed by heating expandable resin particles filled into a mold (molding space), a tortoise-shell pattern occurs, for example, due to variations in particle size and foaming density of the expandable resin particles. Even in a case where such a tortoise-shell pattern occurs, the tortoise-shell pattern can be made inconspicuous by forming the first ridges 8T1 and the second ridges 8T2 on the upper surface of the tool box 1 (molded foam) as described above. The tool box 1 can be improved in design in this way, thus improving the commodity value. Even in a case where the surface of the tool box 1 (molded foam) is scratched, scratches can be made inconspicuous, because they are cancelled out by the first ridges 8T1 and the second ridges 8T2. For the purpose of achieving these effects, first ridges 8T1 and second ridges 8T2 may be formed on other portions of the above-described tool box 1 where no first ridges 8T1 and no second ridges 8T2 are formed.

Figure 3A:
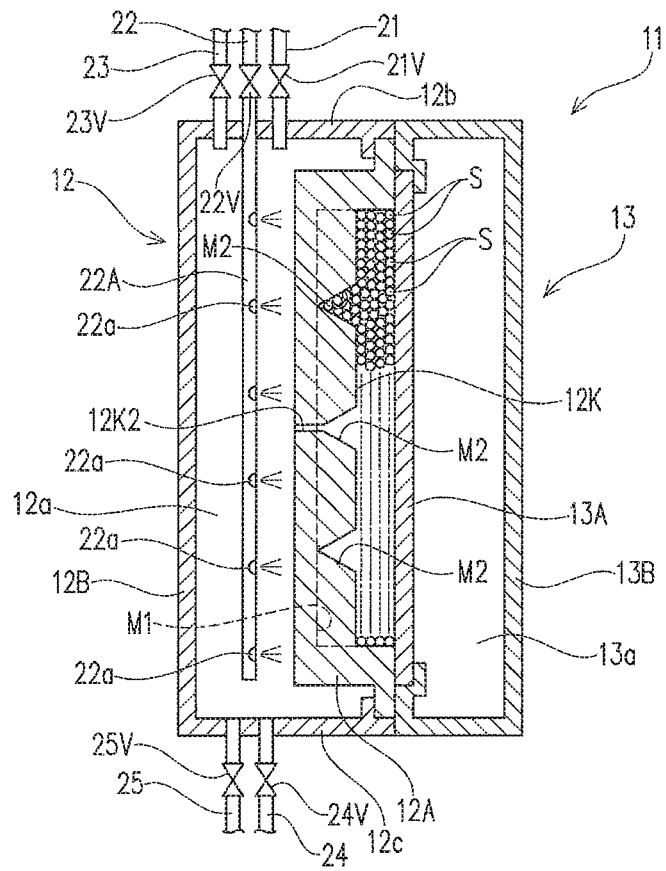
FIGS. 3(a) and 3(b) show a foaming mold for forming the molded foam.

FIGS. 3(a) and 8(b) show a foaming mold 11 (hereinafter, simply referred also to as a "mold") for forming the molded foam. The foaming mold 11 has a pair of mold bodies 12 and 13 as divided parts on the left and right. An inside wall (molding tool) 12A constituting the mold body 12 on the left-hand side and an inside wall (molding tool) 13A constituting the mold body 13 on the right-hand side are disposed opposite to each other. By fitting the front sides (opposed sides) of the left and right inside walls 12A and 13A to each other, a molding space to be filled with expandable resin particles is formed in the mold 11. The mold 11 shown in FIG. 3(a) is a lateral-type mold having a pair of mold bodies 12 and 13 openable and closable along a left-right direction (horizontal direction). The mold 11, however, may alternatively be a vertical-type mold having a pair of mold bodies 12 and 13 openable and closable along a top-bottom direction. Also, while the right inside wall 13A is provided in a plate form as shown in FIG. 3(a), it may alternatively be provided as the same box-type inside wall as the left inside wall 12A. In such a case, a molding space may be formed so that the first and second ridges 8T1 and 8T2 described below are formed on each of the upper and lower surfaces of a molded foam.

The left mold body 12 has the above-described inside wall 12A in a box form opened on the right-hand side and a back plate 12B for forming a heating and cooling chamber 12a by covering the back side of the inside wall 12k The right mold body 13 has the above-described inside wall 13A in a plate form and a back plate 13B for forming a heating and cooling chamber 13a by covering the back side of the inside wall 13A.

Portions of a steam supply pipe 21, a cooling water supply pipe 22 and a compressed air supply pipe 23 on one end (lower end) sides of these pipes are fixed in an upper plate portion 12b of the back plate 12B of the left mold body 12 in a state of being passed through the plate portion while being spaced apart from one another by a predetermined distance. The portions of the steam supply pipe 21, the cooling water supply pipe 22 and the compressed air supply pipe 23 on the one end (lower end) sides are thereby maintained in a state of being inserted in the heating and cooling chamber 12a. Opening and closing valves 21V, 22V and 23V are provided at intermediate positions in the steam supply pipe 21, the cooling water supply pipe 22 and the compressed air supply pipe 23. The cooling water supply pipe 22 has an extension portion 22A extending from the upper plate portion 12b to the vicinity of a lower plate portion 12c described below. Openings 22a through which cooling water is supplied are formed in the extension portion 22A at predetermined intervals along the direction of extension. A steam supply pipe 21, a cooling water supply pipe 22 and a compressed air supply pipe 23, not shown in the figure, are also fixed on the right mold body 13. Opening and closing valves 21V, 22V, and 23V are also provided at intermediate positions in these pipes, the steam supply pipe 21, cooling water supply pipe 22 and compressed air supply pipe 23.

Portions on one end (upper end) sides of a drain pipe 24 and a vacuum supply pipe 25 connected to a vacuum unit are fixed in the lower plate portion 12c of the back plate 12B of the left mold body 12 in a state of being passed through the plate portion while being spaced apart from each other by a predetermined distance. Opening and closing valves 24V and 25V are provided at intermediate positions in the drain pipe 24 and the vacuum supply pipe 25. A drain pipe 24 and a vacuum supply pipe 25, not shown in the figure, are also fixed on the right mold body 13. Opening and closing valves 24V and 25V are also provided in these pipes, the drain pipe 24 and vacuum supply pipe 25.

The left inside wall 12A will be described in detail. A plurality of first groove portions M1 continuously extending along one direction (more specifically, along the top-bottom direction) in a predetermined place (hereinafter, also referred to as an "intended area") in a forming surface 12K of the inside wall 12A. In the intended area, a plurality of second groove portions M2 continuously extending along another direction (more specifically, along the front-rear direction) orthogonal to the first groove portions M1 are formed with the same depth (height) as the first groove portions M1. The "front-rear direction" refers to a direction orthogonal to the left-right direction and the top-bottom direction.

Figure 3B:
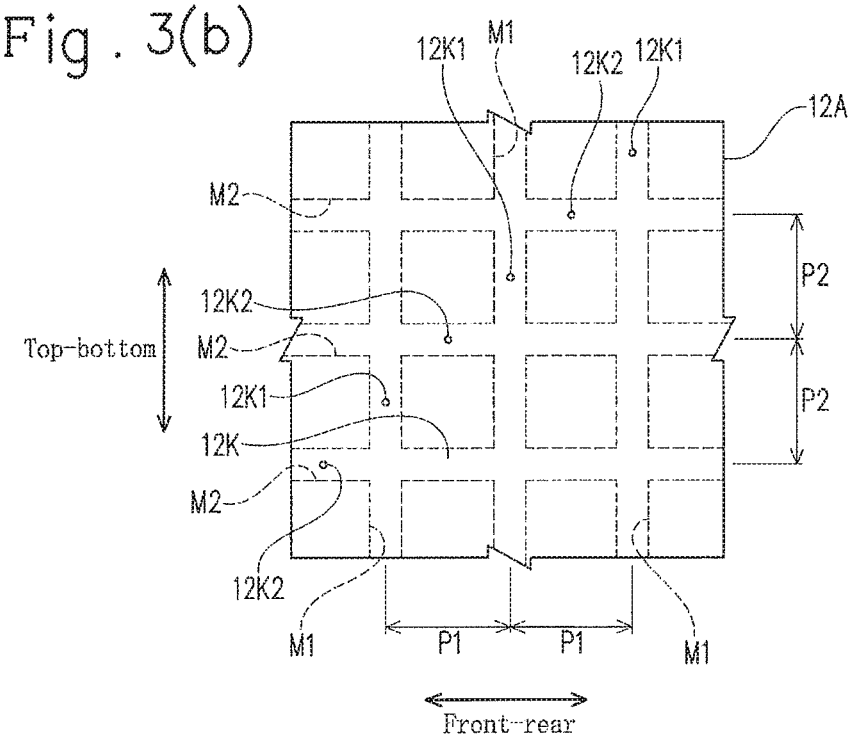

The plurality of first groove portions M1 are arranged in the front-rear direction with a constant pitch P1 set therebetween (see FIG. 3(b)). The plurality of second groove portions M2 are arranged in the top-bottom direction with a constant pitch P2 (P1=P2 in the present embodiment) set therebetween (see FIG. 3(b)). It is preferable to determine the pitches between the plurality of first groove portions M1 and the plurality of first groove portions M2 so that the cooling efficiency is improved. Needless to say, the pitches are not necessarily constant between all the groove portions. Also, while the first groove portions M1 and the second groove portions M2 are orthogonal to each other in the present embodiment, forming the first groove portions M1 and the second groove portions M2 such that the first groove portions M1 and the second groove portions M2 extend in different directions in order to improve the cooling efficiency or the like may suffice. For example, the first groove portions M1 and the second groove portions M2 may be formed so as to intersect each other not orthogonal but obliquely, depending on the shape of the molded article (molded foam).

The intended area is determined only on the forming surface 12K of the left inside wall 12A in the arrangement shown in FIG. 1. However, the present invention is not limited to this. For example, not only the wall surface (forming surface 12K) opposed to the right mold body 13 but also upper and lower wall surfaces opposed along the top-bottom direction in the wall surfaces forming the molding space in the inside wall 12A shown in FIG. 1 may be determined as intended areas. Also, front and rear wall surfaces opposed to each other in the front-rear direction of the inside wall 12A may be determined as intended areas. It is preferable that in order to improve the cooling efficiency or the like, the first groove portions M1 and the second groove portions M2 be formed through the entire areas between ends of the wall surfaces determined as intended areas so as to connect the ends. Furthermore, the ends of the first groove portions M1 and the second groove portions M2 formed in the intended area on the above-described one wall surface and the ends of the first groove portions M1 and the second groove portions M2 formed in the intended areas on the other wall surfaces may be continuous with each other or may not be continuous with each other.

Expandable resin particles S are filled into the molding space formed by the left and right inside walls 12A and 13A thus constructed, and are heated, thereby forming a molded foam. A plurality of first ridges 8T1 and a plurality of second ridges 8T2 (see FIGS. 2(a), 2(b) and 2(c)) are formed on the formed molded foam so as to project.

Passage holes for supplying the molding space (cavity) with steam or cooling water (or cooling air) introduced into the above-described heating and cooling chamber 12a by means of the steam supply pipe 21, the cooling water supply pipe 22, the compressed air supply pipe 23 and the drain pipe 24 are formed in the left inside wall 12A. More specifically, first passage holes 12K1 are formed in the bottom surfaces of the first groove portions M1 of the inside wall 12A, and second passage holes 12K2 are formed in the bottom surfaces of the second groove portions M2 of the inside wall 12A. The first passage holes 12K1 are respectively formed in the first groove portions M1. The first passage holes 12K1 are thus formed by setting the constant pitch P1 in the front-rear direction, similarly to the first groove portions M1. On the other hand, the second passage holes 12K2 are respectively formed in the second groove portions M2. The second passage holes 12K2 are thus formed by setting the constant pitch P2 in the top-bottom direction, similarly to the second groove portions M2. The shape of each of the first and second passage holes 12K1 and 12K2 may be circular, elliptical or rectangular, for example. Each of the first and second passage holes 12K1 and 12K2 may alternatively be in the form of a longitudinal slit. While the only one first passage hole 12K1 and the only one second passage hole 12K2 are formed in each of the first and second groove portions M1 and M2 in the present embodiment, two or more passage holes may be formed in each of the first and second groove portions M1 or M2. One or more first passage holes 12K1 may be formed in every other or every third first groove portions M1 instead of being formed in each first groove portion M1. One or more first passage holes 12K1 may alternatively be formed in particular ones of the first groove portions M1 that are randomly selected. Similarly, one or more second passage holes 12K2 may be formed in every other or every third second groove portions M2. One or more second passage holes 12K2 may alternatively be formed in particular ones of the second groove portions M2 that are randomly selected. Needless to say, passage holes may be formed at points of intersection of the first groove portions M1 and the second groove portions M2. In some cases, the diameter of the first passage holes 12K1 or the second passage holes 12K2 is larger than the width of the first groove portions M1 or the second groove portions M2 or the pitch between the first groove portions M1 or between the second groove portions M2. In such cases, forming part of either first passage hole 12K1 or second passage hole 12K2 inside at least one of the first groove portion M1 and the second groove portion M2 suffices. The positions of the first and second passage holes 12K1 and 12K2 relative to the first and second groove portions M1 and M2 may be regularly set, for example, by setting the constant pitch P2 as described above, or randomly set. Needless to say, at least passage holes may be regularly or randomly formed in the inside wall 13A in the right mold body 13.

The depths of the first groove portions M1 and the second groove portions M2 are preferably 1 mm or less, more preferably 0.3 mm or less. The pitch P1 between the first groove portions M1 and the pitch P2 between the second groove portions M2 are preferably 2 mm to 50 mm, more preferably 30 mm or less (excluding zero). By setting the pitches P1 and P2 as described above, the releasability of the molded foam from the mold 11 (more specifically, the left inside wall 12A) can be improved. All the plurality of first and second groove portions M1 and M2 may be equal in depth to each other or different in depth from each other, or only part of the first and second groove portions M1 and M2 may be different in depth from the others. All the plurality of first and second groove portions M1 and M2 may be equal in width to each other or different in width from each other, or only part of the first and second groove portions M1 and M2 may be different in width from the others.

The method of making the mold 11 (more specifically, the left inside wall 12A) are not restrictively specified. Machining and any other method may be used for making the mold 11. Since the depths of the first groove portions M1 and the second groove portions M2 are small as described above, it is preferable to use etching as the method of making the mold 11 (more specifically, the left inside wall 12A). Use of such a working method ensures that the forming surfaces of the mold having complicated shapes can be formed with accuracy, in addition to the improved design freedom.

The process of forming a molded foam by using the mold 11 constructed as described above will be described mainly with respect to the left mold body 12. The mold 11 shown in FIG. 3 is a concept illustration for explaining the first groove portions M1, the second groove portions M2, the first passage holes 12K1 and the second passage holes 12K2 and does not conform in configuration to a molded foam described below.

First, the front sides (opposed sides) of the left and right inside walls 12A and 13A are fitted to each other. The molding space is formed by the left and right inside walls 12A and 13A. Expandable resin particles S are filled into the formed molding space by using a filling device not shown in the figure. Next, steam is supplied from the left steam supply pipe 21 to the left heating and cooling chamber 12a by setting the left opening and closing valve 21V to the open state. At this time, the drain pipe (not shown) in the right mold body 13 is opened. The steam supplied to the left heating and cooling chamber 12a heats the outer surface of the left inside wall 12A and is supplied to the molding space through the first and second passage holes 12K1 and 12K2 in the inside wall 12A. The steam supplied to the molding space is led to the outside (heating and cooling chamber 13a) of the right inside wall 13A through the passage holes (not shown) in the inside wall 13A. The steam introduced into the heating and cooling chamber 13a in the mold body 13 is discharged out of the right mold body 13 through the drain pipe in the right mold body 13 (not shown) in the mold body 13. By this first heating step, the expandable resin particles S filled into the molding space are evenly heated. Next, the left opening and closing valve 21V is closed and the left drain pipe 24 is opened. Also, the drain pipe (not shown) in the right mold body 13 is closed and the right opening and closing valve (not shown) is opened. Steam is then supplied from the steam supply pipe (not shown) to the right heating and cooling chamber 13a. The steam supplied to the heating and cooling chamber 13a heats the outer surface of the right inside wall 13A and is supplied to the molding space through the passage holes (not shown) in the inside wall 13A. The steam supplied to the molding space is led to the outside (heating and cooling chamber 12a) of the left inside wall 12A through the first and second passage holes 12K1 and 12K2 in the inside wall 12A. The steam introduced into the heating and cooling chamber 12a in the left mold body 12 is discharged out of the mold body 12 through the drain pipe 24 in the left mold body 12. By this second heating step, the expandable resin particles S filled into the molding space are evenly heated. After heating, the right opening and closing valve (not shown) is closed and the left drain pipe 24 is closed. A third heating step is thereafter performed. In the third heating step, in a state where the drain pipes 24 in the two mold bodies 12 and 13 (the drain pipe in the right mold body 13 is not shown) are closed, the opening and closing valves 21V on the two mold bodies 12 and 13 (the opening and closing valve on the right mold body 13 is not shown) are opened and steam is supplied to the heating and cooling chambers 12a and 13b. The supplied steam heats the outer surfaces of the left and right inside walls 12A and 13A and is supplied to the molding space through the first and second passage holes 12K1 and 12K2 in the left inside wall 12A and the passage holes (not shown) in the right inside wall 13A. Thereby, the expandable resin particles S filled into the molding space are again heated.

After the completion of heating, the opening and closing valves 22V on the two mold bodies 12 and 13 (the right opening and closing valve is not shown) are opened. Cooling water is then sprayed from the openings 22a of the extension portion 22A to the left and right inside walls 12A and 13A, thereby cooling the left and right inside walls 12A and 13A. At this time, part of the cooling water enters the space between the left and right inside walls 12A and 13A (i.e., the molding space) by passing through the first and second passage holes 12K1 and 12K2 in the left inside wall 12A and the passage holes in the right inside wall 13A. Therefore, cooling of the molded foam is promoted. The molded foam starts shrinking by being cooled. Gaps are thereby formed between the molded foam and the left and right inside walls 12A and 13A. The cooling water can spread easily over the intended areas by flowing into the first groove portions M1 and the second groove portions M2 through these gaps, thus improving the cooling efficiency of the molded foam.

After the completion of cooling with the cooling water, the opening and closing valves 23V on the two mold bodies 12 and 13 (the right opening and closing valve is not shown) are opened. Compressed air is then supplied from the compressed air supply pipes 23 to the heating and cooling chambers 12a and 18a. The compressed air supplied to the heating and cooling chambers 12a and 13a is supplied to the molding space through the first and second passage holes 12K1 and 12K2 and the passage holes in the right inside wall 13A. The compressed air supplied to the molding space leads the cooling water remaining in the left inside wall 12A to the first and second passage holes 12K1 and 12K2 and the passage holes in the right inside wall 13A by passing through the gaps between the molded foam and the left and right inside walls 12A and 13A. The cooling water is thereby discharged to the outsides (heating and cooling chambers 12a and 13a) of the inside walls 12A and 13A through the first and second passage holes 12K1 and 12K2 and the passage holes in the right inside wall 13A. The cooling water discharged into the heating and cooling chambers 12a and 13a is discharged out of the left and right mold bodies 12 and 13 through the left and right drain pipes 24. This compressed air also has a role of cooling the left and right inside walls 12A and 13A and the molded foam.

Subsequently, a decompression cooling step is performed. In the decompression cooling step, the opening and closing valves 24V in the drain pipes 24 in the two mold bodies 12 and 13 (the right opening and closing valve is not shown) are closed and the opening and closing valves 25V (the right opening and closing valve is not shown) are thereafter opened. The interiors of the heating and cooling chambers 12a and 13a are then decompressed by means of the vacuum supply pipes 25. Water remaining in the heating and cooling chambers 12a and 13a, and moisture attached to or contained in the molded foam formed are thereby evaporated, thereby completing the decompression cooling step. At this time, cooling of the molded foam is promoted by using evaporation latent heat accompanying the evaporation of water. Thereafter, the mold 11 is opened by separating the left and right inside walls 12A and 13A, and the left and right opening and closing valves 23V (the right opening and closing valve is not shown) are opened. Compressed air for mold release is then supplied from the left and right compressed air supply pipes 23 (the right compressed air supply pipe is not shown) to the heating and cooling chambers 12a and 13a. The compressed air is thereby supplied to the gaps between the left and right inside walls 12A and 13A and the molded foam through the first and second passage holes 12K1 and 12K2 and the passage holes in the right inside wall 13A (the right passage holes are not shown), thereby releasing the molded foam from the left and right inside walls 12A and 13A. The process is completed by taking the molded foam out of the space between the left and right inside walls 12A and 13A. Needless to say, mold release pins may be provided in the mold and used together with compressed air to release and take out the molded foam. Also, the molded foam may be released and taken out only with the release pins.

In the mold 11 in the present embodiment, as described above, the first groove portions M1 are continuously formed from one end of the intended area on the forming surface of the left inside wall 12A to the other end along the top-bottom direction, while the second groove portions M2 are continuously formed from one end of the intended area on the mold 11 to the other end along the front-rear direction. Also, the first and second passage holes 12K1 and 12K2 are used as inlet and outlet holes for supplying steam for heating expandable resin particles or cooling water (or cooling air) for cooling the molded foam immediately after foaming to the interior of the mold. With these arrangements, steam or cooling water supplied through the first passage holes 12K1 and the second passage holes 12K2 is enabled to easily spread over the intended area on the forming surface via the first and second groove portions M1 and M2 continuously formed. Moreover, steam or cooling water is uniformly supplied in every direction along the forming surface. Therefore, the moldability and the cooling efficiency can be improved.

Water produced by cooling of steam in the molding space during the cooling step and cooling water will remain in the molding space. The remaining water and cooling water are speedily discharged out of the molding space with reliability through the first passage holes 12K1 and the second passage holes 12K2 formed in correspondence with the first groove portions M1 and the second groove portions M2. Thus, accumulation of water in the mold 11 (more specifically, in the mold body 12) can be prevented to avoid hindrance to filling of expandable resin particles by water accumulated in the mold 11 (more specifically, in the molding space) at the time of next foaming step. Therefore, the filling operation can be performed with reliability and the moldability can be improved. Since the problem of accumulation of water in the mold 11 (mold body 12) is avoided, a process of cooling with cooling water can be positively adopted. As a result, the cooling efficiency is improved and cycle-up can be achieved by a time reduction effect.

Furthermore, the first passage holes 12K1 and the second passage holes 12K2 are used for supplying compressed air for releasing the formed molded foam from the left inside wall 12A. Since the first and second passage holes 12K1 and 12K2 are formed in the first and second groove portions M1 and M2, compressed air can be supplied directly to the first and second groove portions M1 and M2, thereby enabling the compressed air to be easily delivered uniformly to the intended areas on the forming surfaces through the first and second groove portions M1 and M2, and enabling mold release to be smoothly performed. Moreover, because of the arrangement enabling compressed air to flow into the first and second groove portions M1 and M2 which extend in different directions, compressed air can be dispersed uniformly along the surface of the molded foam in contact with the left inside wall 12A at the time of release of the molded foam from the mold after foaming, thus enabling the molded foam to be released more smoothly.

Figure 4:
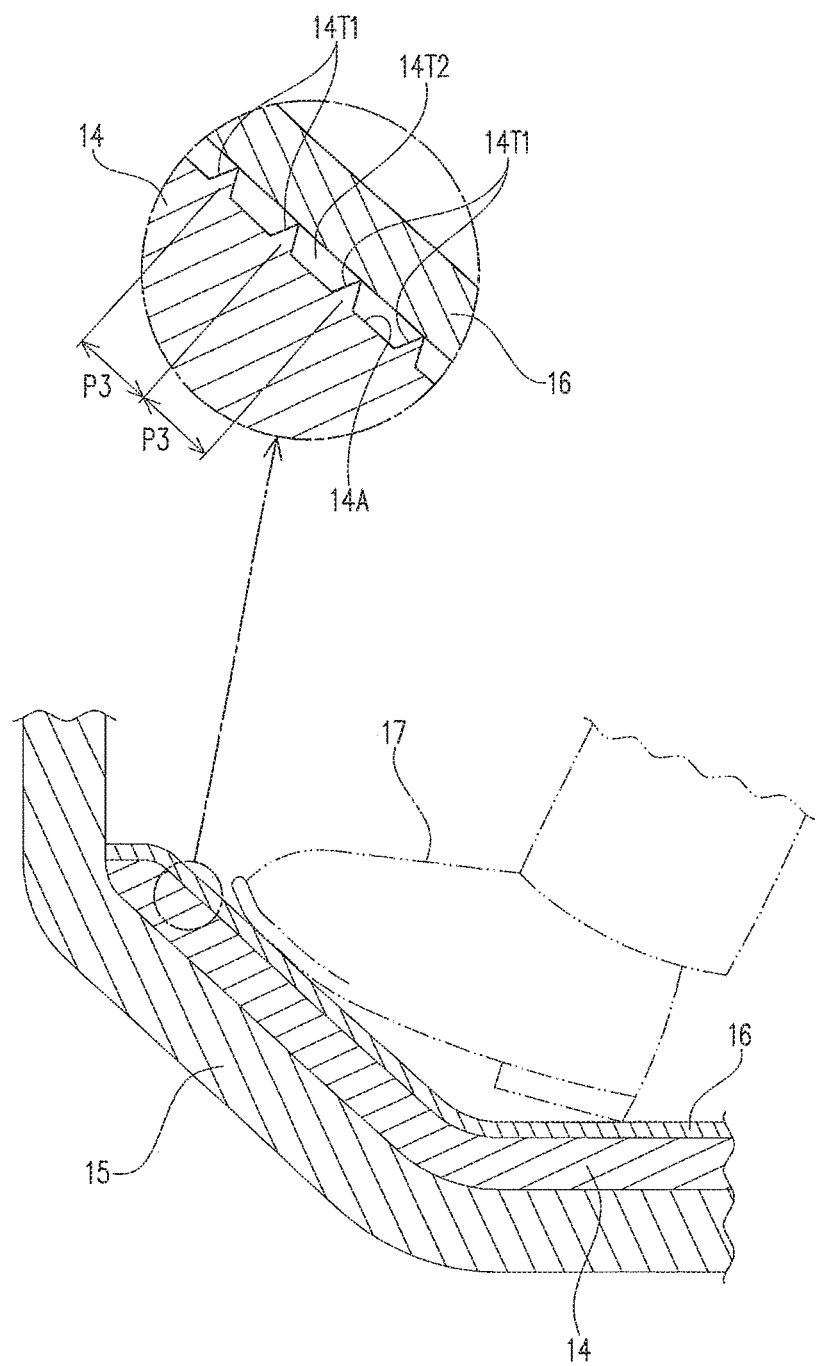
FIG. 4 is a longitudinal sectional view of a lower portion of a vehicle having a tibia pad (a molded foam in a second embodiment).

The molded foam formed by foaming with the mold 11 constructed as described above can be used as a tibia pad 14 to be provided on a font seat floor of a vehicle as shown in FIG. 4 (or can be used as a floor spacer provided on a vehicle rear seat floor). The tibia pad 14 is placed between a floor panel 15 and a floor carpet placed as an interior member on the floor panel 15. The tibia pad 14 placed in this way is intended to improve the shock-absorbing effect against passenger's feet 17 so that the riding comfort is high.

The above-described tibia pad 14 is constituted by a molded foam formed by heating expandable resin particles so that the resin particles are foamed into a foam in a plate form. The tibia pad 14 has a plurality of first ridges 14T1 projecting upward from its upper surface 14A and extending straight along a left-right direction. The tibia pad 14 also has a plurality of second ridges 14T2 projecting upward from its upper surface 14A to the same height as that of the first ridges 14T1 and extending straight along a front-rear direction orthogonal to the first ridges 14T1. The plurality of first ridges 14T1 are arranged in the front-rear direction with a constant pitch P3 set therebetween. The pitch P3 may be the same as the constant pitch P1 shown in FIG. 2(b) or different from the pitch P1. Also, the plurality of second ridges 14T2 are arranged in the left-right direction with a constant pitch set therebetween. The pitch between the second ridges 14T2 may be the same as the constant pitch P3 between the first ridges 14T1 or different from the pitch P3. Each of the first ridges 14T1 and the second ridges 14T2 has a sectional shape tapered toward its top, more specifically, a generally triangular sectional shape.

The thus formed tibia pad 14 is placed between the floor panel 15 and the floor carpet 16. The tibia pad 14 is thereby enabled to stably support, for example, a load received by the floor carpet 16 from the passenger's feet 17, by its first ridges 14T1 and the second ridges 14T2, when the passenger gets into the vehicle. The first ridges 14T1 and the second ridges 14T2 are thereby brought into suitable contact with the floor carpet 16 to enable effective prevention of the occurrence of unusual noise. Moreover, the floor carpet 16 is stabilized against movement relative to the tibia pad 14, so that the floor carpet 16 can also be prevented from shifting in position relative to the tibia pad 14. While the first ridges 14T1 and the second ridges 14T2 are formed only on the front surface of the tibia pad 14 (the surface to be brought into contact with the floor carpet 16) in the arrangement shown in FIG. 4, first ridges 14T1 and second ridges 14T2 may also be formed on the back surface of the tibia pad 14 (the surface to be brought into contact with the floor panel 15).

The present invention is not limited to the above-described embodiments. Various changes can be made in the described embodiments without departing from the scope of the gist of the invention.

While an interior member (tibia pad 14) incorporated in a vehicle has been described in the above-described embodiment as a molded foam, an object such as an ornamental, a sofa or a bed placed in a room, a cushioning member placed under a floor, or the like other than interior members incorporated in a vehicle may be constituted by a molded foam in accordance with the present invention.

Figure 5A:
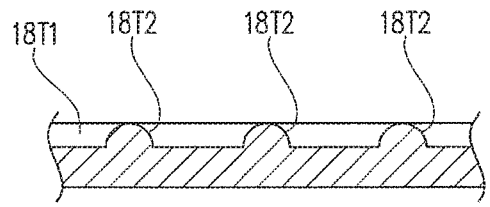
FIGS. 5(a), 5(b), and 5(c) are longitudinal sectional views of molded foams in other embodiments.
Figure 5B:
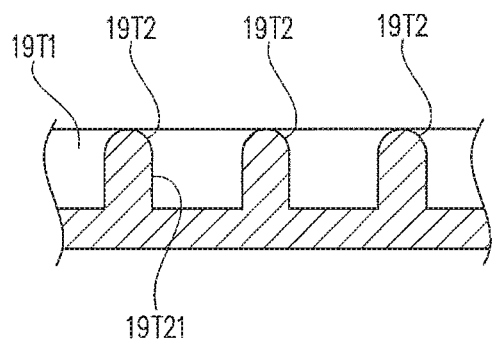
Figure 5C:
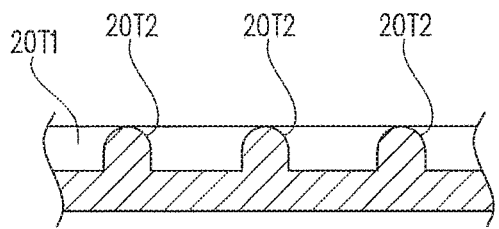

In the above-described embodiments, each of the first ridges and the second ridges of the molded foam has a triangular sectional shape tapered toward its top. However, each ridge may have any other shape. For example, each ridge may have a round shape with no angular corner at the top. More specifically, ridges 18T1 and 18T2 may have a shape projecting in a curved form from a surface of a molded foam, as shown in FIG. 5(a), that is, has a semicircular shape. Ridges 19T1 and 19T2 may also have a base portion 19T21 having two surfaces rising from a surface of a molded foam in parallel to each other and perpendicular to the surface of the molded foam, as shown in FIG. 5(b), that is, has the upper half of an oval shape. Ridges 20T1 and 20T2 may also have a shape projecting from a surface of a molded foam while being smoothly curved, as shown in FIG. 5(c), that is, has the upper half of an elliptical shape. Thus, each ridge formed in this way has a tapered shape having a smoothly continuous contour (formed by a smoothly continuous contour line). While each ridge has a tapered shape in the above-described embodiments, the shape of each ridge is not limited to such a tapered shape. Each ridge may have a non-tapered shape. For example, each ridge may have a rectangular sectional shape (having four angular corners at the top) constant in width in the top-bottom direction (in other words, between the tip and the base). Also, for example, when base portions each having two surfaces rising from a surface of a molded foam are provided in addition to the configurations shown in FIG. 5, an arrangement may be provided in which the top (upper end) of one of the two surfaces is increased in height relative to the top (upper end) of the other, and the tops differing in height are connected to form a slanting surface. An arrangement in which the above-described tapered shape is provided on each of the tops (upper ends) of the two surfaces differing in height may alternatively be provided. The surfaces of the base portion may be perpendicular to the surface of the molded foam or may be formed as slanting surfaces rising toward a center of the ridge. A tapered shape stepped from the base portions may alternatively be provided.

Figure 6A:
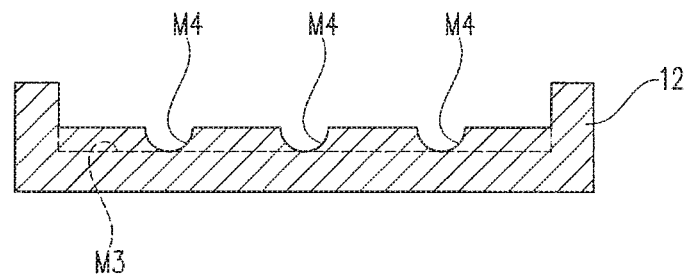
FIGS. 6(a), 6(b), and 6(c) are longitudinal sectional views of foaming molds (more specifically, left inside walls) for forming the molded foams shown in FIG. 5.
Figure 6B:
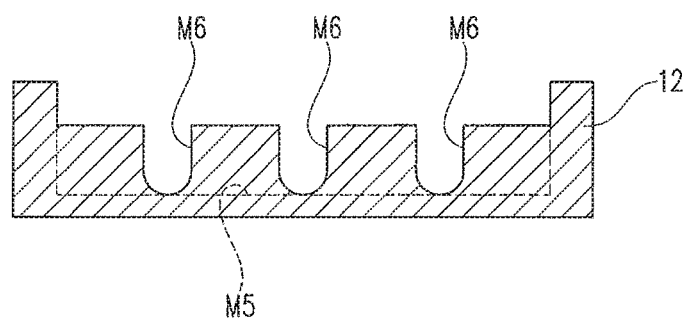
Figure 6C:
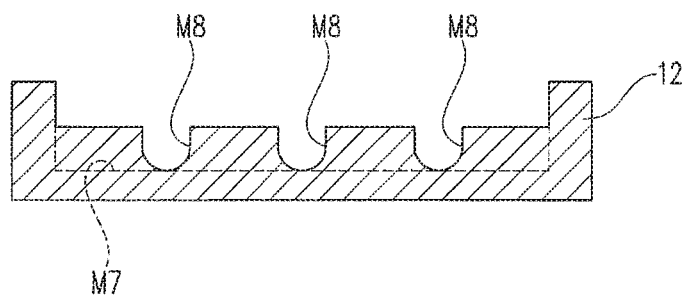

FIGS. 6(a), 6(b) and 6(c) show molds (more specifically, left inside walls 12A) for forming the molded foams shown in FIGS. 5(a), 5(b) and 5(c). That is, FIG. 6(a) shows a mold (more specifically, a left inside wall 12A) for molding the molded foam shown in FIG. 5(a). In such an inside wall, semicircular groove portions M3 and M4 are formed. FIG. 6(b) shows a mold (more specifically, a left inside wall 12A) for molding the molded foam shown in FIG. 5(b). In such an inside wall, groove portions M5 and M6 each having a shape corresponding to the upper half of the oval shape are formed. FIG. 6(c) shows a mold (more specifically, a left inside wall 12A) for molding the molded foam shown in FIG. 5(c). In such an inside wall, groove portions M7 and M8 each having a shape corresponding to the upper half of the elliptical shape are formed.

In the above-described embodiments, the first ridges 8T1 are arranged with a constant pitch and the second ridges 8T2 are also arranged with a constant pitch. However, the invention may be implemented by setting one or both of the first and second ridges 8T1 and 8T2 with irregular pitches.

In the above-described embodiments, each of the first ridges 8T1 and the second ridges 8T2 is linearly formed. However, each ridge may alternatively be constructed in a continuous zigzag form or in a continuous curved form. Also, the first ridges 8T1 and the second ridges 8T2 may be formed so as to intersect each other at a predetermined angle different from 90 degrees instead of being formed so as to orthogonally intersect each other.

Figure 7:
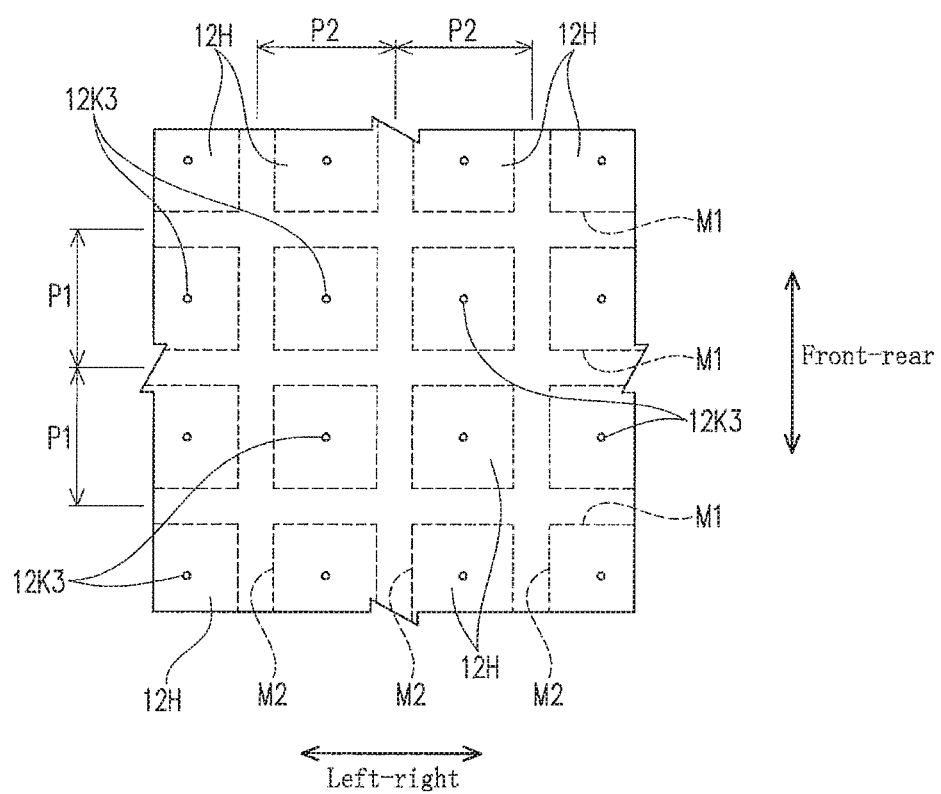
FIG. 7 is a plan view (bottom view) of a foaming mold in another embodiment in which the positions of passage holes are changed.

In the above-described embodiments, the first passage holes 12K1 are formed in the first groove portions M1, while the second passage holes 12K2 are formed in the second groove portions M2. However, passage holes 12K3 may be formed in portions other than the first groove portions M1 and the second groove portions M2, as shown in FIG. 7. More specifically, passage holes 12K3 may be formed in portions at the middle (not necessarily at the middle) between each adjacent pair of the first groove portions M1 and at the middle (not necessarily at the middle) between each adjacent pair of the second groove portions M2.

Further specifically, passage holes 12K3 may be formed at centers (not necessarily at centers) of flat surface portions 12H, each being formed by being surrounded on all sides by the first groove portions M1 and the second groove portions M2.

While passage holes 12K3 are formed in all the flat surface portions 12H surrounded on all sides, passage holes 12K3 may be formed only in particular ones of the flat surface portions 12H. A mold having the passage holes 12K shown in FIG. 7 in addition to the first passage holes 12K1 and the second passage holes 12K2 shown in FIG. 3 may be provided.

REFERENCE SIGNS LIST

1 Tool box
2, 3, 4 Storage portion
5 Box body

5A Lower surface of box body
6 Flange portion
6A Lower surface of flange portion
7 Lid
7A Contact member of lid
8A Upper surface of tool box
8T1 First ridge
8T2 Second ridge
9 Frame member
9A Upper surface of frame member
10 Vehicle constituent member
11 Foaming mold
12, 13 Mold body
12A, 13A Inside wall
12H Flat surface portion
12K Forming surface
12K1, 12K2, 12K3 Passage hole
12a, 13a Heating and cooling chamber
14 Tibia pad
14A Tibia pad upper surface
14T1 First ridge
14T2 Second ridge
15 Floor panel
16 Floor carpet
17 Foot
18T1, 18T2, 19T1, 19T2, 20T1, 20T2 Ridge
M1 First groove portion
M2 Second groove portion
M3 to M8 Groove portion
S Expandable resin particle

The invention claimed is:

1. A foaming mold provided with a molding space for forming a molded foam, comprising:
a forming surface for forming the molding space;
the forming surface including a plurality of first groove portions that are formed to extend in one direction and arranged with a pitch set therebetween in another direction which intersects with the one direction, and a plurality of second groove portions that are formed to extend in the other direction, arranged with a pitch set therebetween in the one direction, and intersect with the plurality of first groove portions;
the plurality of first groove portions and the plurality of second groove portions have a depth of 1 mm or less, and a proportion of a region in which the plurality of first groove portions and the plurality of second groove portions are formed in a unit area of the forming surface is 80% or less; and
at least one passage hole for supplying the molding space with steam is provided inside the at least one of the first groove portions or the second groove portions.

2. The foaming mold according to claim 1, wherein the plurality of first groove portions are arranged with a constant pitch in the other direction, and the plurality of second groove portions are arranged with a constant pitch in the one direction.

3. The foaming mold according to claim 1, wherein the plurality of first groove portions and the plurality of second groove portions each have a sectional shape tapered toward its bottom.

4. The foaming mold according to claim 2, wherein the plurality of first groove portions and the plurality of second groove portions each have a sectional shape tapered toward its bottom.

5. The foaming mold according to claim 3, wherein the tapered shape has a smoothly continuous contour in cross section of the plurality of first groove portions and the plurality of second groove portions.

6. The foaming mold according to claim 4, wherein the tapered shape has a smoothly continuous contour in cross section of the plurality of first groove portions and the plurality of second groove portions.

7. The foaming mold according to claim 3, wherein the tapered shape has an acute contour in cross section of the plurality of first groove portions and the plurality of second groove portions.

8. The foaming mold according to claim 4, wherein the tapered shape has an acute contour in cross section of the plurality of first groove portions and the plurality of second groove portions.

9. A foaming mold comprises:
a steam supply pipe,
a cooling water supply pipe,
a compressed air supply pipe, and
a molding space for forming a molded foam, comprising:
a forming surface for forming the molding space;
the forming surface including a plurality of first groove portions that are formed to extend in one direction and arranged with a pitch set therebetween in another direction which intersects with the one direction, and a plurality of second groove portions that are formed to extend in the other direction, arranged with a pitch set therebetween in the one direction, and intersect with the plurality of first groove portions;
the plurality of first groove portions and the plurality of second groove portions have a depth of 1 mm or less, and a proportion of a region in which the plurality of first groove portions and the plurality of second groove portions are formed in a unit area of the forming surface is 80% or less; and
at least one passage hole for supplying the molding space with steam is provided inside the at least one of the first groove portions or the second groove portions.

10. The foaming mold according to claim 9, wherein the foaming mold has a pair of mold bodies as divided parts, and molding space is formed by fitting the pair of mold bodies together, and wherein one mold body comprises the steam supply pipe, a first cooling water supply pipe, and a first compressed air supply pipe, and the other mold body comprises a second cooling water supply pipe, and a second compressed air supply pipe.

* * * * *